FIG. 1

INVENTOR
HAROLD C. CASSEY

FIG. 2

INVENTOR
HAROLD C. CASSEY
BY
ATTORNEY

June 28, 1960      H. C. CASSEY      2,942,632
LOCKING STRUCTURE FOR POWER TOOL SETTING
Filed March 8, 1957      8 Sheets-Sheet 4

INVENTOR
HAROLD C. CASSEY
BY *Bradley Cohn*
ATTORNEY

June 28, 1960

H. C. CASSEY

2,942,632

LOCKING STRUCTURE FOR POWER TOOL SETTING

Filed March 8, 1957

INVENTOR
HAROLD C. CASSEY
BY
ATTORNEY

June 28, 1960  H. C. CASSEY  2,942,632
LOCKING STRUCTURE FOR POWER TOOL SETTING
Filed March 8, 1957  8 Sheets-Sheet 7

INVENTOR
HAROLD C. CASSEY
BY
ATTORNEY

United States Patent Office 2,942,632
Patented June 28, 1960

2,942,632
LOCKING STRUCTURE FOR POWER TOOL SETTING

Harold C. Cassey, Landisville, Pa., assignor, by mesne assignments, to American Machine & Foundry Company, a corporation of New Jersey Filed Mar. 8, 1957, Ser. No. 644,864

9 Claims. (Cl. 143—6)

This invention relates to sawing machines, and more particularly to that type of sawing machine known as the radial arm saw in which the sawing mechanism is suspended above the work table by a cantilever arm.

In this type of tool the cantilever arm is pivotally mounted on an elevating standard and the sawing mechanism is mounted on an anti-friction carriage movable along the arm. The carriage has a vertical pivot for rotating the sawing mechanism in a horizontal plane and further a horizontal pivot for rocking the sawing mechanism for bevel cutting.

Thus the saws have a variety of articulations both sliding and pivotal. It is desirable that these articulations may be moved either a measured linear amount or through a measured angular rotation with great accuracy. With respect to angular rotation it is further desired that more commonly used angular positions have positive locating and locking or indexing means.

It is an object of this invention to provide several of the points of rotation with positive locking or indexing means and frictional locking means for points intermediate the positive locking means.

It is a further object of the invention to provide an improved form of such locking means and to provide a single action which will operate both the positive locking means and the frictional locking means.

It is a further object of the invention to provide an improved elevating means adaptable to both manual and power operation incorporated in such a tool.

It is a further object of the invention to improve various articulations to facilitate manufacture at reduced cost.

It is a further object of the invention to provide a new and improved adjustable structure to delimit the motion of the carriage along the radial arm.

It is a further object of the invention to incorporate certain of the rotary articulations and improved hub adjusting mechanism particularly in conjunction with improved locking and indexing means.

The novel features which I believe to be characteristic of my invention are set forth with particularity in the appended claims. My invention itself, however, both as to its organization and method of operation may be understood by reference to the following description taken in connection with the accompanying drawings in which:

Figure 1:
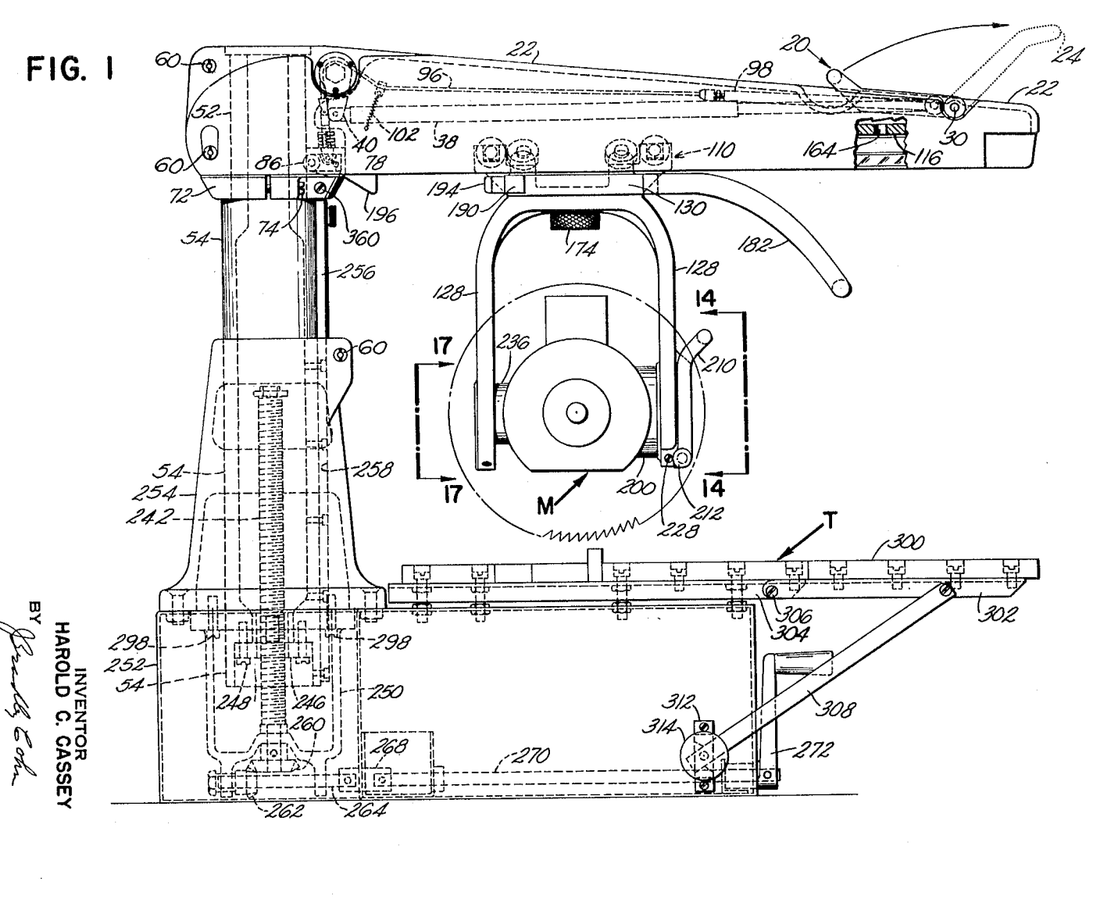
Fig. 1 is a side elevation of the radial arm saw illustrating the improved features of the same.
Figure 2:
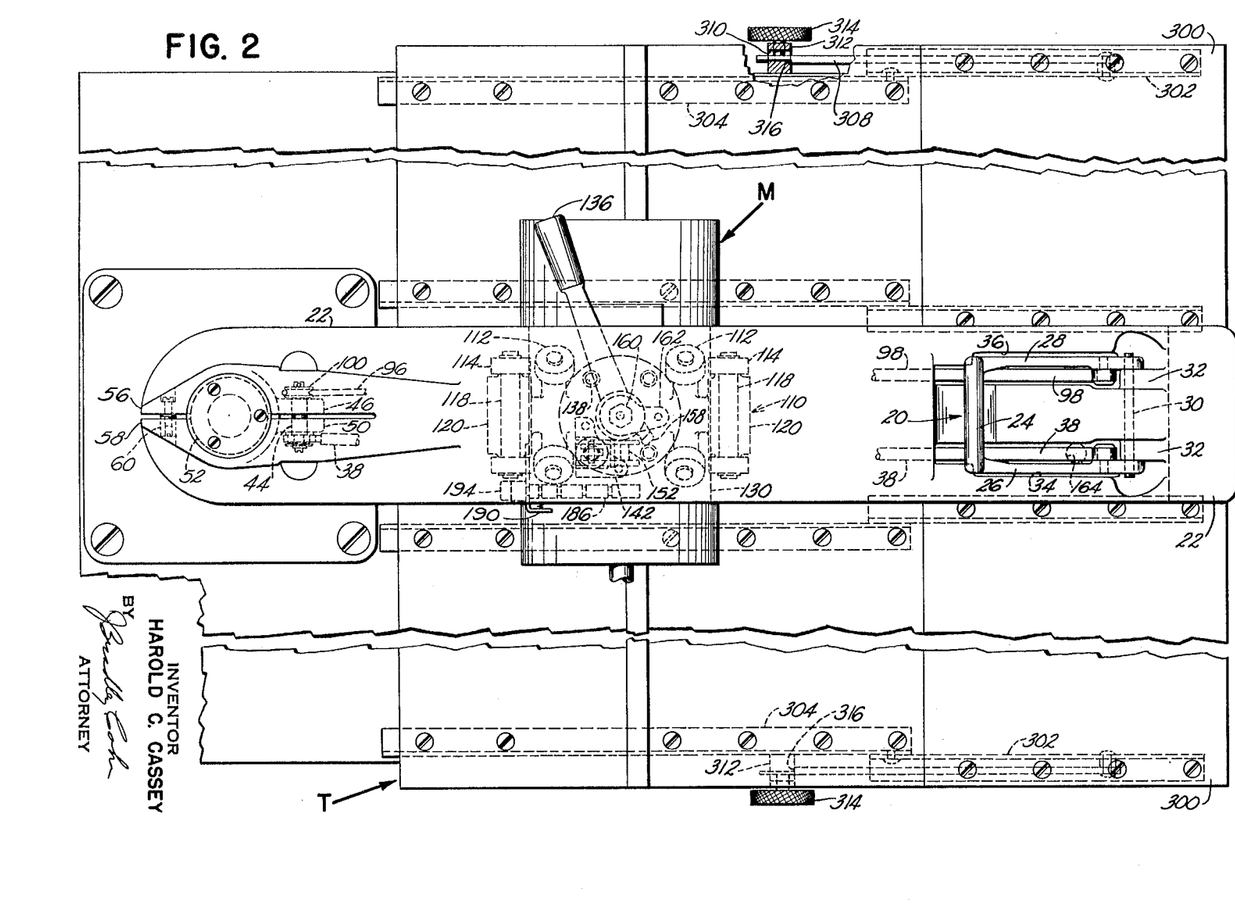
Fig. 2 is a plan view of the same.
Figure 3:
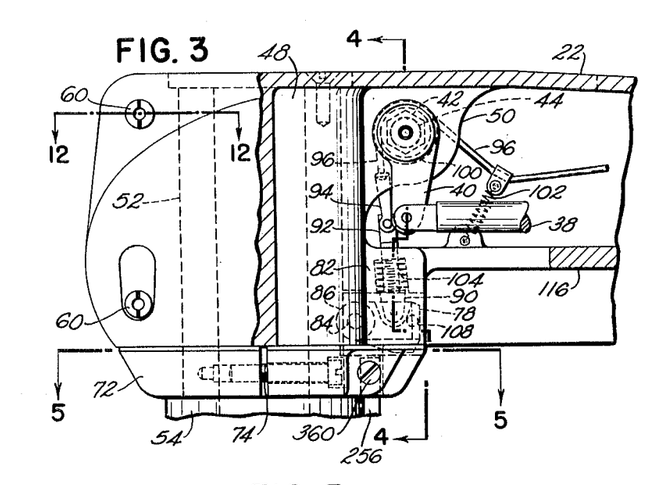
Fig. 3 is a side elevation, partly in section, of the improved radial arm miter index and locking mechanism.
Figure 4:
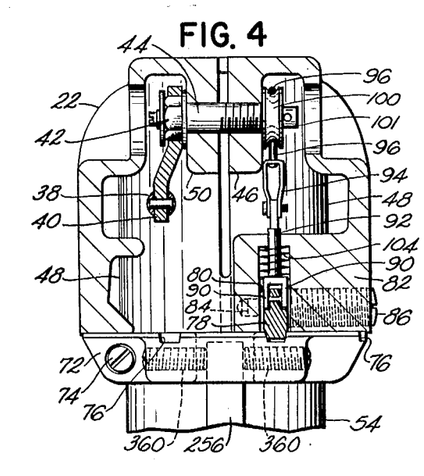
Fig. 4 is a sectional end elevation of the same, taken on line 4—4 of Fig. 3.

The improved radial arm miter indexing and locking mechanism illustrated in Figs. 1, 2, 3, 4, 5 and 6 is actuated by means of a single lever generally designated as 20 which is conveniently located within easy reach of the operator at the front end of the radial arm 22. The actuating lever 20 consists of a handle portion 24 which forms the connection of a pair of spaced arms 26 and 28 the free ends of both of which are pivotally mounted on a horizontal rod or shaft 30 held by a pair of suitable lugs 32 projecting from the arm 22. (Figs. 1 and 2.) Both arms 26 and 28 protrude through suitable openings or slots 34 and 36, respectively, in the top portion of the inverted trough-shaped radial arm 22 so that when the lever 20 is in its horizontal or locked position, the arms 26 and 28 are substantially flush with the top surface of the radial arm 22. To the lower portion of arm 26 is pivotally attached one end of an adjustable connecting rod 38 while the other end of said rod is pivotally connected to a wrench lever 40 which engages with the hexagon head 42 of a clamp bolt 44 (Figs. 3 and 4).

The threaded portion of said clamp bolt engages with a threaded bore in a flange 46 of the partially split hub portion 48, while the smooth portion of the clamp bolt rotatably protrudes through a suitable bore in a flange 50 opposite the flange 46 of the partially split portion 48 of the radial arm 22. It is self-evident that any clockwise movement of wrench lever 40 will cause a clamping of the hub 48 of radial arm 22 to the upper portion 52 of the post or standard 54 while any anti-clockwise movement of said wrench lever 40 would permit free rotary movement of said radial arm 22 about the upper portion 52 of the standard 54 spacially since said hub is designed in such a manner as to provide a controlled clearance and tolerance so that less than 90° of movement of the wrench lever 40 may effect a clamping or unclamping of the hub to or from the upper portion 52 of the standard 54.

Figure 12:
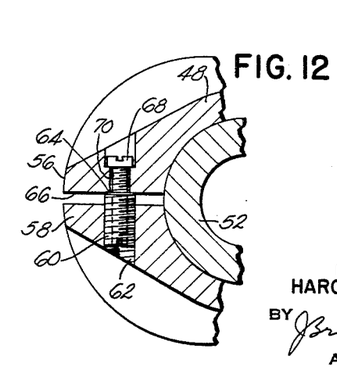
Fig. 12 is a partial sectional plan view of the radial arm hub, taken on line 12—12 of Fig. 3 illustrating the improved adjustable mounting and clamping mechanism.

This controlled clearance or tolerance is achieved by splitting the rear portion of said hub 48 as illustrated in Figs. 2 and 12 and providing the split portions with suitable flanges 56 and 58 which in turn are connected by a pair of push-pull clamp screws such as illustrated in Fig. 12. Each push-pull clamp screw consists of an externally and internally threaded sleeve 60 inserted in a threaded hole 62 of flange 58 in such a manner that the lower face 64 of said sleeve engages with the face 66 of the flange 56, while a clamp screw 68 is inserted in a suitable hole 70 of flange 56 while its threaded portion engages with the internal thread of sleeve 60 in the flange 58. An arrangement of this type will permit the hub 48 of radial arm 22 to slightly open and consequently facilitate mounting of said arm during assembly operation after which the push-pull clamp is then re-set to obtain the desired degree of fit of the hub 48 on the upper portion 52 of the standard 54. The hub 48 of radial arm 22 rotatably rests on the top face of an index disc 72 which is adjustably secured to the upper portion 52 of standard 54 by means of a clamp screw 74. The top face of the index disc 72 is provided with a plurality of accurately milled grooves or slots 76 (Fig. 5) which when engaged by an index latch lug 78 (Fig. 6) carried by the radial arm 22 will assure the correct setting of said arm during cross-cut as well as miter cut operations. The index latch lug 78 is pivotally supported in a suitable slot 80 of a boss 82 in arm 22 by means of a horizontal stud 84 which is integral with and projects from the end of a threaded stud 86 of larger diameter held by a suitable threaded bore in the boss 82. Stud 86 is inserted in such a manner that the stepped face 88 contacts the face of the hub of the latch lug 78 to eliminate any looseness or play of the latch lug 78 in the slot 80 and thus assures accuracy in the setting of the radial arm 22. To latch lug 78 is pivotally connected the lower forked end 90 of a vertical plunger 92 (Figs. 3 and 4) the top end of which, by means of a yoke clip 94 is connected to one end of a cable 96 while the other end of the latter is secured to the free end of a link or rod 98 pivotally attached to the lower portion of arm 28 of the actuating lever 20 (Figs. 1 and 2). Cable 96 is led over a suitable pulley 100 and provided with a predetermined amount of slack (Figs. 1 and 3) which is taken up by a suitable spring tension device 102, the action of which will be described hereinafter. Pulley 100 is loosely supported by an extension 101 (Fig. 4) integral with and projecting from the end of the clamp bolt 44. Plunger 92 is also provided with a tension spring 104 confined in a suitable bore of boss 82 and acting upon the forked end 90 of said plunger to effect downward pressure upon the latch lug 78 to assure that the latter stays in engagement with the proper selected slot 76 in the index disc 72. To assure the utmost accuracy and to prevent even the slightest possibility of wiggle of the setting of the radial arm 22 the free forward side edge 106 is in close tolerance sliding contact with the end of a guide screw 108 (Fig. 6) inserted in a suitable threaded hole in boss 82.

The change of the position of the radial arm from a cross cut position to a miter cut position, is extremely efficient, simple and convenient. The operator simply grasps the handle 24 of the actuating lever 20 and moves the latter in the direction indicated by the arrow shown in Fig. 1 to the position indicated in dotted lines in the same figure. The lifting of lever 20 by the operator accomplishes two successive functions. The first portion of the movement of lever 20 only effects an anti-clockwise movement of wrench lever 40 causing the loosening of the clamp bolt 44 and thus the unclamping of the hub 48 of radial arm 22 from the top portion 52 of the standard 54. Due to the slack provided in the cable 96, this first portion of the movement of the lever 20 has no effect upon the plunger 92 of the index latch lugs 78, since the spring 102 compensates for this lost motion. However, as soon as the cable 96 becomes taut it imparts a lifting motion upon the plunger 92 which in turn effects a disengagement of the latch lug 78 from the slot 76 in the index disc 72 which occurs shortly before the lever 20, pulled by the operator, reaches its forwardmost position. The machine is so designed and the slack in cable 96 so calculated that the hub 48 of radial arm 22 is completely unclamped before the latch lug 78 is disengaged from either one of the slots 76 in index disc 72. In re-engaging the latch lug 78 with one of the slots 76 of the index disc 72 the sequence, of course, reverses itself so that a backward movement of lever 20 by the operator effects first the engagement of the latch lug 78 with the index disc and then the clamping of the hub 48 of radial arm 22 to the standard. This arrangement constitutes a tremendous improvement over prior methods of locking and indexing done by two separate operations and in back of the machine.

Figure 5:
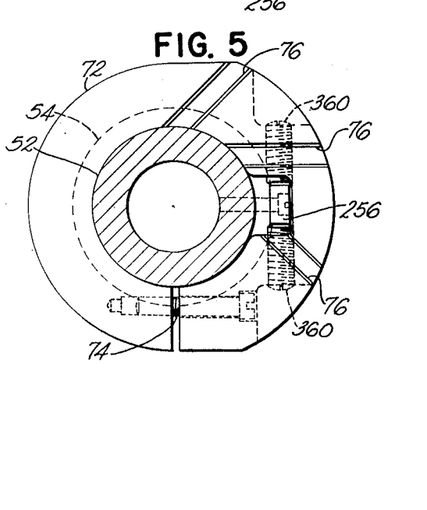
Fig. 5 is a detail plan view of the radial arm miter indexing disc taken on line 5—5 of Fig. 3.
Figure 6:
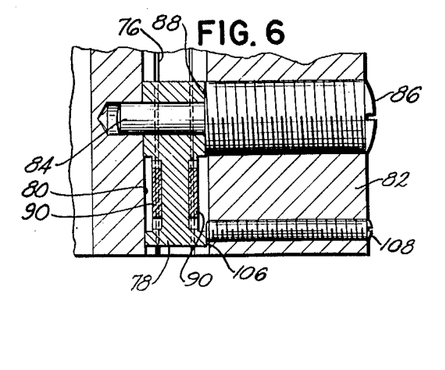
Fig. 6 is an enlarged sectional plan view illustrating in detail the construction of the radial arm locking latch.

As illustrated in Fig. 5, the index disc 72 is shown with three slots 76, corresponding to the 90° cross cut position of arm 22, and to the left and right hand 45° miter positions. It is obvious that more slots could be provided if desired, however, these are the more common miter angles, which are accurately located and engaged by latch lug 78. For intermediate angles, the arm may be located by reference to a dial or scale (not shown). Then lever 20 is moved to its lock position to tighten wrench lever 40 to hold the arm 20 in the desired angular position. In this situation plunger 92 and latch lug 78 rest on the top of disc 72. The additional slack in cable 96 is taken up by spring 102. Thus, arm 22 may be locked in an infinite number of angular positions by the means associated with wrench lever 40. It may be accurately positioned and locked in selected predetermined angular positions by the lug 78 and the aforementioned lock means all operated from lever 20.

Figure 7:
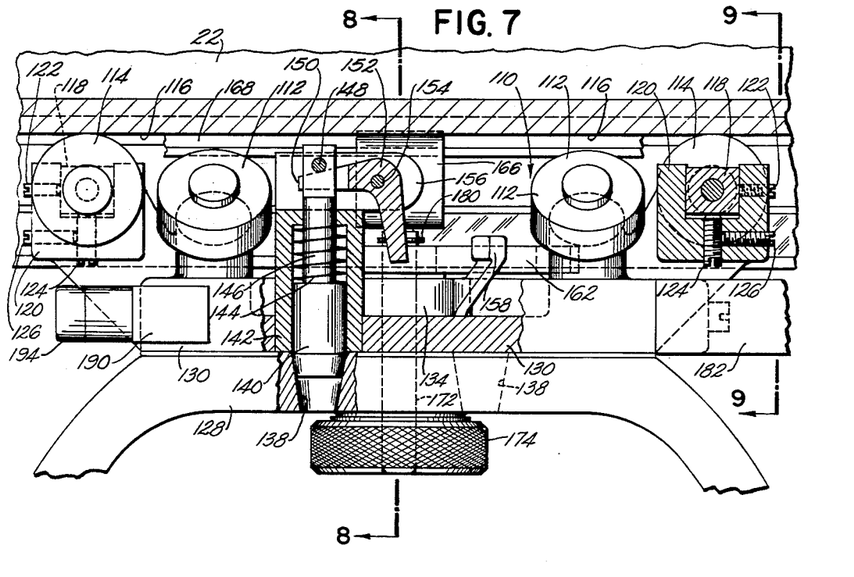
Fig. 7 is a partial sectional side elevation of the radial arm illustrated in conjunction with the improved saw carriage roller head and yoke indexing lock.
Figure 8:
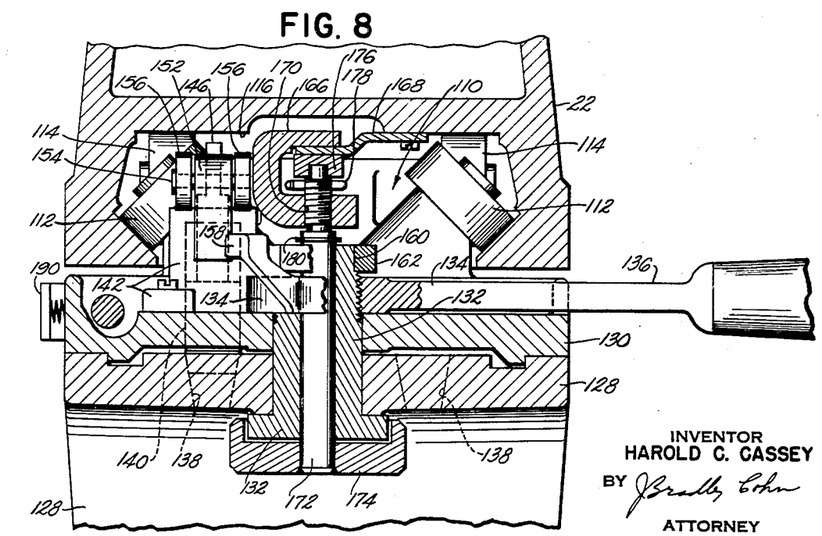
Fig. 8 is a sectional end elevation of the same taken on line 8—8 of Fig. 7, illustrating the yoke indexing lock as well as a new and improved rip lock.
Figure 9:
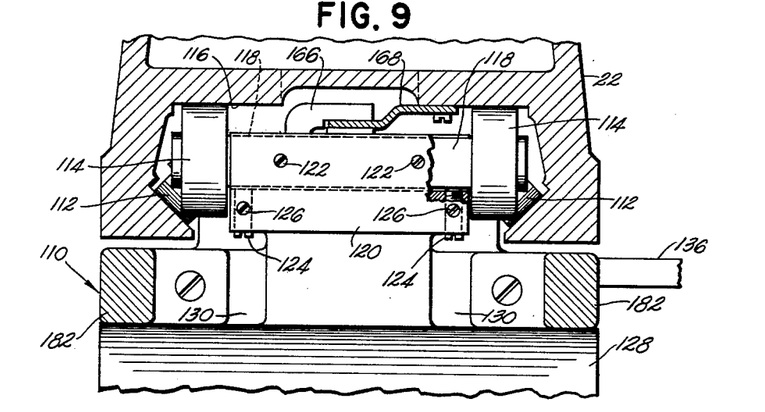
Fig. 9 is also a sectional end elevation of the radial arm, taken on line 9—9 of Fig. 7 showing the roller head aligning and adjusting mechanism.

The novel indexing lock for the saw carriage roller head and yoke movement is illustrated in Figs. 7, 8 and 9. There is also illustrated on these figures a novel arrangement of the anti-friction rollers of the carriage. The arrangement obviates costly and tedious adjustment of the rollers and is substantially self-aligning. In the roller carriage 110 illustrated in the drawings, two pairs of 45° angularly mounted rollers 112 support the weight of the carriage while two pairs of adjustably mounted vertically parallel rollers 114 located outwardly of the angular rollers 112 engage with the upper tracks 116 in arm 22 and act as guide rollers. The 45° angularly mounted rollers 112 are mounted and pre-set at the time of manufacture and have no adjustment means. Each pair of the vertically parallel rollers 114 is mounted on an adjustable block 118, each of which in turn is held in position in a slotted lug 120 by means of a pair of horizontal set screws 122 and a pair of vertical set screws 124. Adjustment and alignment is made by tightening the vertical screws 124 to a point that just permits the carriage 110 to reciprocate along arm 22. Each vertical set screw 124 is provided with a lock screw 126 to hold said set screws in adjusted position. This orientation eliminates the necessity of adjustment on all pairs of rollers. It makes the adjustment automatic during the life of the rollers and without resort to use of light means for testing the adjustment.

A saw carrying yoke 128 is rotatably suspended from the carrier member 130 of the roller carriage 110 by means of a king bolt 132 (Fig. 8) the left hand threaded upper portion of which engages with a threaded bore in a hub 134 of a yoke clamp handle 136. By moving the latter horizontally clockwise or anti-clockwise the yoke may be unclamped and unlocked or clamped and locked respectively. The top portion of the yoke 128 is provided with four conical holes 138 spaced 90° apart. Each hole, depending on the desired setting of the saw may be engaged by the conical end of a spring mounted plunger 140. The latter is vertically and slidably mounted in a plunger housing 142 suitably secured to the carrier member 130. The plunger 140 itself is urged downward by a suitable tension spring 144 surrounding the stepped shank 146 of the plunger and confined within the plunger housing 142. The upper portion of the plunger shank 146 carries a pin 148 (Fig. 7) which engages with the forked arm 150 of a bell crank lever 152 which straddles said shank and is pivotally supported by means of a stud shaft 154 held by a pair of suitable lugs 156 projecting from the plunger housing 142. The bell crank lever 152 and consequently the plunger 140 is activated by means of a suitably shaped camlike actuator lug 158 which is integral with and projects from the hub 134 of the yoke clamp handle 136. As mentioned heretofore, a horizontally clockwise movement of the yoke clamp handle 136 will first loosen the king bolt 132 and thus effect an unlocking of the yoke 128 from the carrier member 130 and second, upon continued movement cause the activator lug 158 to engage with the bell crank lever 152 and effect a lifting of plunger 140 and thus cause a disengagement of the latter from one of the conical holes 138 in the upper portion of the yoke 128. The latter may now be turned 90° or 180° as desired, upon which an anticlockwise movement of handle 136 first permits the plunger 140 to engage with that hole 138 which corresponds with the desired position, after which, upon continued anticlockwise movement of handle 136 the king bolt 132 is tightened to further effect a frictional locking of the yoke 128 to the carrier member 130. To provide maximum convenience and safety the yoke index lock can only be actuated and the yoke turned when the roller carriage 110 is in its extreme forward position on the radial arm 22. A suitable clearance hole 164 (Figs. 1 and 2) for the upper end of shank 146 provided in the track structure at this point only of the arm 22 permits the plungers 140 to be lifted by the bell crank lever 152 sufficiently to enable said plunger to disengage from one of the holes 138 of the yoke 128.

To assure the correct tension of the king bolt 132 at the time of the assembly of the machine as well as equip the machine with adjusting means of said tension due to wear and tear, the upper portion of the king bolt 132 is provided with a hexagon end 160 (Figs. 2 and 8) which carries a suitable wrench 162 by manipulation of which said tension may be adjusted to any desired degree.

In order to lock the roller carriage 110 to the arm 22 after the saw carrying yoke is turned to "rip" position, i.e., with the saw in a plane extending transversely of arm 22 the machine is provided with a unique rip lock which consists of a U-shaped rip lock shoe 166 (Figs. 7 and 8) the upper free end of which slidingly engages with a rip lock plate 168 which extends substantially over the full length of the arm 22 and is suitably secured to one of the tracks 116 within said arm. The lower end of the lock shoe 166 is provided with a threaded bore 170 (Fig. 8) which engages with the threaded upper end of a vertical stem 172 which is rotatably supported in a suitable bore in the center of the king bolt 132. To the lower end of stem 172 is secured a knurled hand knob 174 by means of which said stem may be turned clock or anti-clockwise. The upper free end of stem 172 carries a lock cap 176 and adjacent the upper end of the threaded portion of said stem is provided a cotter pin 178. Adjacent the upper end of the smooth shank portion of the stem 172 is also mounted a snap ring 180.

Figs. 7 and 8 illustrate the rip lock mechanism in fully clamped or locked position. In order to unlock the same the operator turns the hand knob 174 counter-clockwise which will cause the snap ring 180 to come to rest on the top end of the king bolt 132. Continuing the counter clockwise rotation of the knob 174 will cause the rip lock shoe 166 to ascend until it is arrested by the cotter pin 178. With the shoe 166 in this raised and unclamped position the roller carriage 110 may be moved freely by the operator by means of a suitable arm 182 (Fig. 1) secured to the front edge of the carrier member 130.

Figure 10:
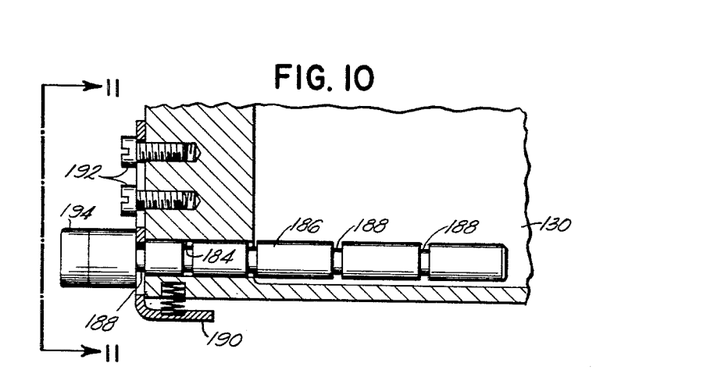
Fig. 10 is a sectional plan view illustrating an adjustable bevel bumper carried by the roller head.
Figure 11:
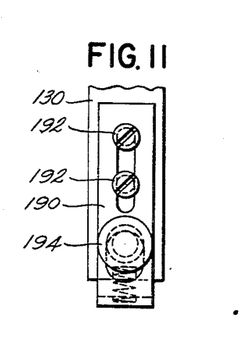
Fig. 11 is an end elevation of the same, taken on line 11—11 of Fig. 10.

In order to provide means for an adjustable stop of the roller carriage 110 the carrier member 130 in a suitable bore 184 (Fig. 10) supports a horizontal shaft 186 provided with a plurality of spaced annular grooves 188 each of which, depending on the setting desired, may be engaged with a spring-loaded slotted bracket 190 slidably secured to the rear edge of the carrier member 130 by means of screws 192. (Figs. 10 and 11.) The rearwardly projecting end of the shaft 186 also carries a bumper head 194 provided for the purpose of engaging with a stationary bumper 196 (Fig. 1) when the roller carriage is moved to its backward stop position by the operator. This backward stop position can easily be changed by simply pressing against the side of the slotted bracket 190 and by moving the shaft 186 either in or out and then permitting bracket 190 to re-engage with the selected slot 188.

Figures 14, 15, 16, 17:
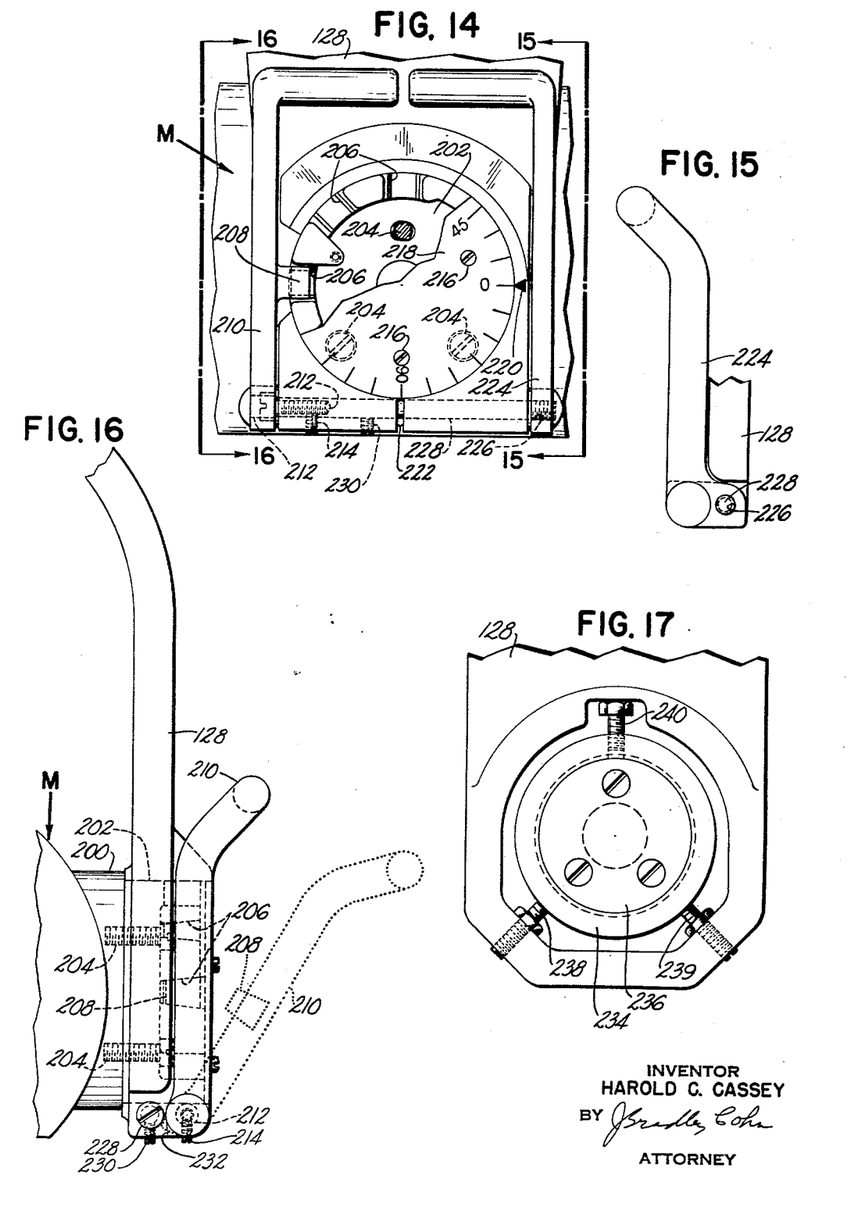
Fig. 14 is a front elevation of the saw bevel indexing and locking mechanism.
Fig. 15 is a side elevation of the saw bevel clamping and locking arm, taken on line 15—15 of Fig. 14.
Fig. 16 is a side elevation of the saw bevel indexing mechanism, taken on line 16—16 of Fig. 14.
Fig. 17 is a rear view of the saw motor suspension taken on line 17—17 of Fig. 1, illustrating the hub adjusting mechanism.

In order to assure proper angle or bevel cutting the machine is also equipped with a new and novel bevel index and lock control mechanism such as illustrated in Figs. 14, 15 and 16. For this purpose the front motor trunnion 200 of motor M is provided with an index flange 202 concentric and adjustably secured to said trunnion by means of screws 204. Index flange 202 is provided with a plurality of suitable bevelled notches 206 spaced 45° apart which may be engaged by a correspondingly shaped index lug 208 secured to an index lever 210 which is pivotally mounted on the lower front end of the yoke 128 by means of a suitable stud 212 locked by means of a set screw 214. Index flange 202 by means of suitable bosses and screws 216 carries a suitable circular dial or scale plate 218 which, of course, is provided with suitable cutouts (not shown) to permit the index lug 208 to engage with the notches 206 in flange 202. A suitable pointer 220 (Fig. 14) is also provided. The lower front end of the yoke 128 is split and provided with a space 222 to permit clamping and locking of the trunnion 200 after the desired setting is accomplished. The clamping of the trunnion is accomplished by the manipulation of a lock lever 224 which at its lower end is provided with a threaded bore 226 which engages with the threaded end of a clamp screw 228 passing through the split front end of the yoke 128 as illustrated in Fig. 14. The clamp screw 228 is prevented from turning by means of a suitable lock screw 230. In order to change the saw setting from a vertical cut to a 45° bevel cut the operator pulls the lock lever 224 which unlocks the trunnion and the index lever 210 which effects a disengagement of the index lug 208 from the notch 206 of the index flange 202. The handle of the levers are in close spaced axial alignment to enable the operator to grasp both simultaneously with one hand. The motor and trunnion is then turned 45° and the index lever 210 is pushed back again causing the engagement of the index lug 208 with the proper slot 206. The operator then pushes the lock lever 224 back, which, of course, effects the clamping and locking of the trunnion. This can be done in one motion provided the lever 210 leads. In case it is desired to saw a bevel of 20° or any other angle where no notch is provided the index lever 210 is left in its forward position indicated by dotted lines in Fig. 16 after the setting is made and only the lock lever 224 is then pushed home to effect the locking of the trunnion. To prevent the index lever 210 from dropping down when in forward position the hub of the latter is provided with a suitable stop lug 232 which engages with the projecting head of the clamp screw 228 when arriving at this position.

For the purpose of providing proper heel adjustment for the motor trunnion bearing in the rear fork of the yoke 128, the bearing 234 of the rear motor trunnion 236 is suspended between three easily accessible adjusting screws 238, 239 and 240 (Fig. 17). This arrangement provides a combined micrometer adjustment and alignment for the motor trunnion in conjunction with a rigid support and a desirable three point suspension.

The standard 54 supporting radial arm 22 is raised and lowered by means of a vertical threaded spindle 242 (Figs. 1 and 13) which engages with a conventional ball nut 244.

Ball nut 244 is secured to a disc 246 which in turn by means of screws 248 (Fig. 13) is mounted in a recess at the bottom end of the vertical standard or column 54. The lower end of spindle 242 is rotatably supported by a suitable bearing in bracket 250 secured to the lower side of a frame structure 252. The vertical standard 54 is slidably supported by a suitable stand or base 254 mounted on the top side of the frame 252. To the standard 54 is secured a key 256 which runs the entire length of said standard. Key 256 engages with a suitable keyway 258 in the stand 254 and is employed for the purpose of preventing the standard 54 from turning. To the bottom end of spindle 242 is secured a bevel gear 260 (Fig. 13) meshing with a bevel gear 262 mounted on a horizontal shaft 264 which is rotatably supported in bearing lugs 266 projecting from the bottom portion of bracket 250. To one end of the shaft 264 is secured a suitable coupling 268 which may be engaged with the shaft 270 of a crank 272 so that the turning of said crank will effect the turning of the vertical spindle 242. Since said spindle by means of the ball nut 244 is connected to the vertical standard 54 which in turn on its top portion carries the radial arm 22, a clockwise or anti-clockwise turning will result in a raising or lowering of said radial arm 22. If desired the manually operated crank 272 may be replaced by a suitable reversible reduction gear motor (not shown).

Figure 13:
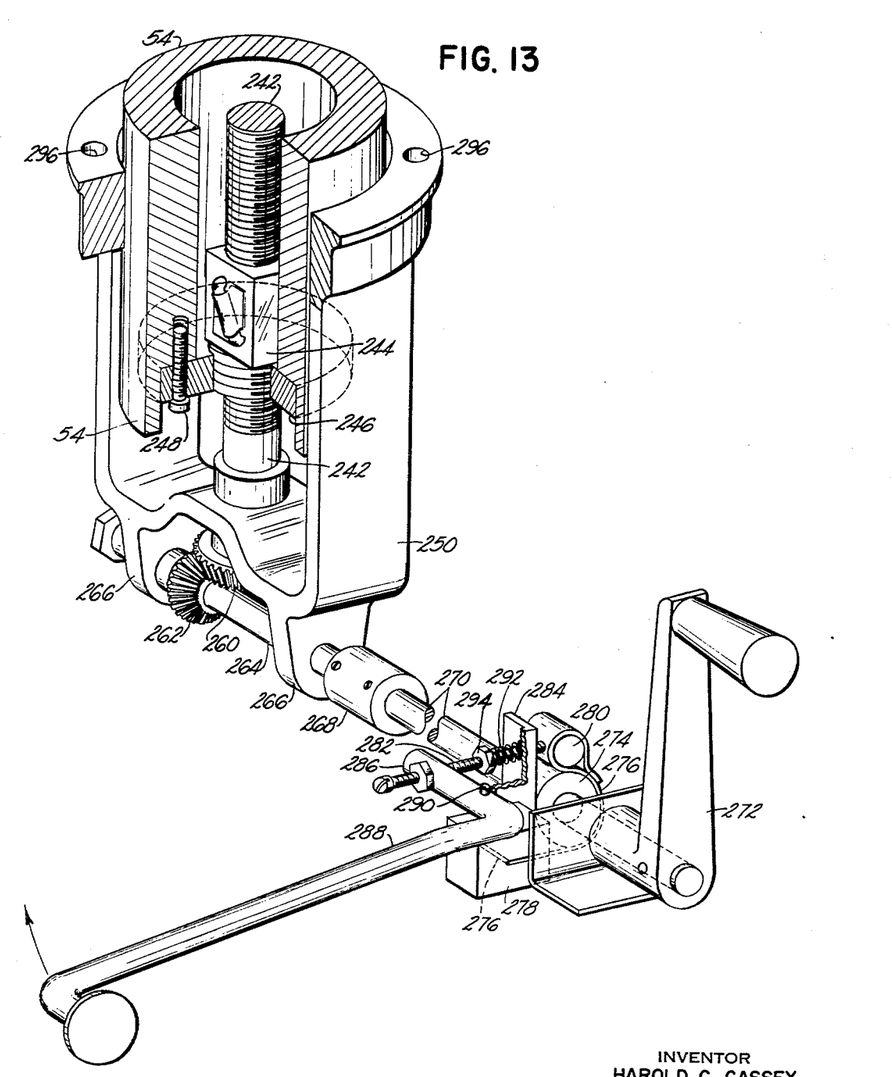
Fig. 13 is an isometric view, partly in section, illustrating the improved column elevating mechanism in conjunction with an elevating brake.

Due to the employment of the practically frictionless ball nut 244 in conjunction with the weight of the standard 52 and radial arm 22 acting upon the same, the spindle 242 may have a tendency to turn by itself and effect and permit a downward travel of the radial arm 22. To guard against such undesired movement the elevating system is provided with a braking device as illustrated in Fig. 13 of the drawings. The brake device consists of a drum 274 secured to the shaft 270 of the elevating crank. It could likewise be secured to the shaft of a reversible gear reduction motor if desired. However, a gear reduction motor itself serves as a brake and hence no further braking means is usually necessary.

Drum 274 is in engagement with a steel band 276 which tends to bind and lock itself to the drum upon downward rotation. Band 276 on one end is suitably secured to a bracket 278 while the other end is anchored to a round bar 230 secured to the end of a screw 282 which protrudes through a suitable hole in an upright rib 284 of bracket 278. Screw 282 is adjustably held by an arm 286 of a suitable bell crank lever 238 pivotally secured to bracket 278 by means of a stud 290. A tension spring 292 surrounding said screw 282 and confined between a nut 294 carried by said screw and the upright rib 284 is provided to impart tension to the steel band 276 contacting the brake drum 274. This tension may be adjusted to any desired degree. The band is released from the drum by simply pressing the bell crank lever 288 in the direction of the arrow indicated in Fig. 13.

The elevating system illustrated in Figs. 1 and 13 is designed in such a manner that costly spotting and aligning work during assembly operation is eliminated. The elevator bracket 250 and its connecting parts, including the standard 54 are assembled separately and then inserted from the bottom of the frame work into the already mounted stand 254. The holes 296 for the mounting screws 298 in the upper flange of bracket 250 are made large enough to permit slight shifting of the unit if such shifting is necessary. The structure is therefore self-aligning and high tolerance expensive machinery is obviated. The table safety extension is illustrated in Figs. 1 and 2. This extension consists of a drop leaf 300 which adjacent to its two side edges is secured to a pair of suitable bracket members 302 which on one end are pivotally attached to the table frame 304 of the table T by means of suitable bolts 306. To each of the two bracket members 302 is pivotally secured one end of a supporting bar 308 while the free end of the latter protrudes through a slot 310 (Fig. 2) in a bracket 312 mounted on the side of the frame of the machine. A suitable clamp screw 314 supported in a threaded bore of bracket 312 is provided for locking the bar 308 in the slot 310 of the bracket 312 when the drop leaf 300 is in either raised or lowered position. For added safety's sake and to prevent the leaf 300 from dropping during operation in case the clamp screw 134 is not set tight, the lower free end of each bar 308 is provided with a step 316 which engages with the front edge of the bracket 312 when the leaf is in its up position thus preventing an accidental downward sliding of bars 308.

Figure 18:
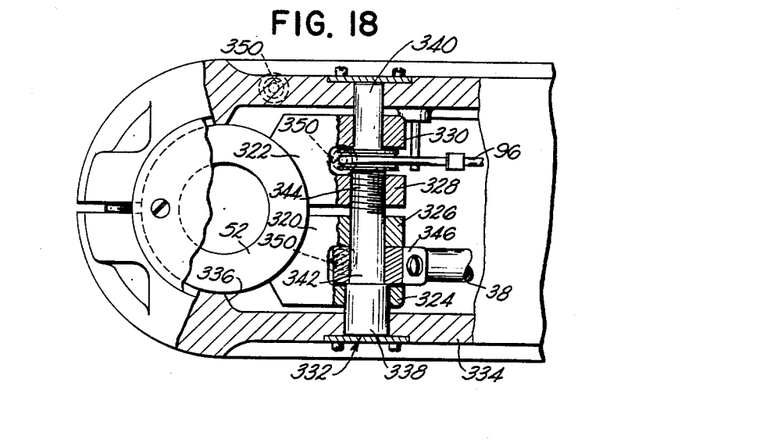
Fig. 18 is a partial plan view, partly in section, of the radial arm, illustrating a modified form of the miter indexing and locking mechanism.
Figure 19:
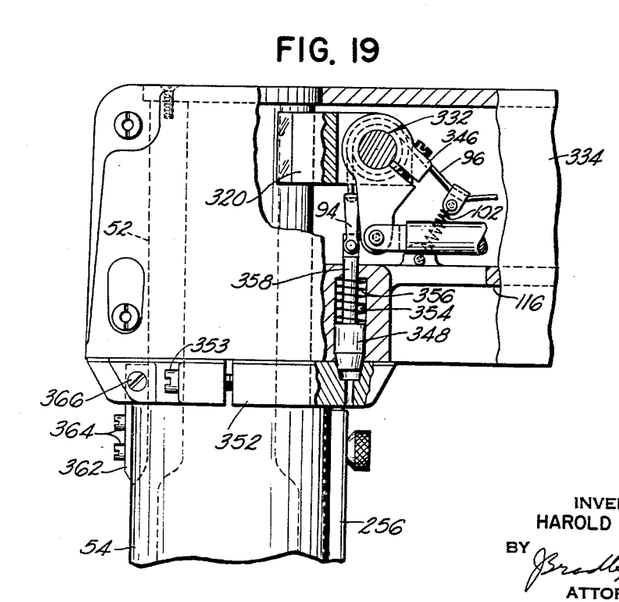
Fig. 19 is a side elevation, partly in section, of the modified radial arm miter, indexing and locking mechanism illustrated in Fig. 18.

The modified miter indexing and locking mechanism illustrated in Figs. 18 and 19 consist of a pair of clamp shoes 320 and 322 both of which are positioned to engage with the top end 52 of the vertical column or standard 54. Each shoe 320 and 322 is provided with a pair of lugs 324 and 326, and 328 and 330, respectively, by means of which said shoes are supported by a clamp shoe bolt 332. The latter is rotatably supported in suitable bearings in the radial arm 334 which is substantially of the same design and construction as the radial arm 22 shown in Figs. 1, 2, 3 and 4 with the exception that arm 334 in Figs. 18 and 19 is provided with only a partial or semicircular hub 336 with which it engages with the upper portion 52 of column 54. The clamp bolt 332 adjacent each end is provided with two stepped bearing portions 338 and 340 while the center portion consists of a smooth portion 342 and a threaded portion 344. The latter engages with a threaded bore in the lug 328 of the clamp shoe 322, while the other lug 330 of the same shoe loosely engages with the smooth bearing portion 340 of said bolt 332. Lug 324 of the clamp shoe 320 loosely engages with the smooth bearing portion 338 of bolt 332 while lug 326 of the same shoe engages freely with the smooth stepped down center portion 342. Loosely in the space between lugs 324 and 326 of clamp shoe 320 but tightly secured to the portion 342 of bolt 332 is located a shoe wrench lever 346. The latter on its free end is pivotally connected to the rod 38 of identical construction and same function as the one shown in Figs. 1, 2, 3, and 4, so that when the actuating lever 20 is lifted by the operator the clamp bolt 332 is caused to turn and thus effecting an unclamping of the shoes 320 and 322 from the upper portion 52 of the column and consequently an unclamping of the radial arm from said column. A downward movement of lever 20, of course, clamps the shoes against the column and locks the radial arm again.

The radial arm 334 shown in Figs. 18 and 19 is also equipped with a modified miter indexing device, which consists of a conical plunger 348 designed to engage with one of the three holes 350 spaced 45° apart in the indexing disc 352 which is of similar design and construction as the disc 72 illustrated in Figs. 3, 4, and 5, with the exception that conical holes instead of slots are provided. The indexing disc 352, of course, is also secured to the upper portion 52 of the vertical column 54 by means of clamp screw 353 (Fig. 19) and the lower face of the hub of the radial arm 334 rests rotatably on the face of the index disc 352 in the same manner as in the preferred form illustrated in Figs. 1, 2, 3 and 4. The plunger 348 is vertical slidably supported in a suitable bore 354 of a boss in arm 334 and is also provided with a tension spring 356 employed for the purpose of urging the plunger 348 downward. The upper end of the stepped down shank 358 of said plunger is pivotally connected to the yoke clip 94 which, of course, forms the connection to the same cable arrangement as illustrated in Figs. 1, 2, 3 and 4, of the preferred embodiment. An upward pull on the activating lever 20 will effect the raising of the plunger 348 in the same manner as described heretofore.

The accurate setting and adjusting of the miter index disc 72 for the radial arm 22 illustrated in Figs. 3, 4 and 5 is accomplished by the proper setting of the two opposed set screws 360 which contact the side edges of the rigidly mounted key 256 on column 54 which projects into an opening in said disc. By loosening clamp screw 74 of index disc 72 and adjusting the set screws 360 the most accurate setting of the index may be attained.

In the modified construction shown in Fig. 19, the key 256 does not project into the index disc 352 but a short separate key 362 is provided. The latter is secured to the rear of the column 54 by means of screws 364 and projects into a wide slot in said index disc 352. A pair key in the same manner as the screws illustrated in Fig. of opposed set screws 366 contact the side edges of said 5 of the preferred embodiment.

I claim:

1. In a radial arm power tool, a base, a work support table on said base and an arm extending across and spaced vertically from said work supporting table, a carriage longitudinally movable along said arm, said carriage having a bottom plate-like member, a tool supporting yoke having an upper portion formed with a plate-like member, said plate-like members having registering bores formed therein, a kingpin in said bores, said kingpin having means to support said yoke, said kingpin extending upwardly above said upper plate-like member, an annular helical guide on said upper extending portion of said kingpin, a lever having one end free and having its other end about said upwardly extending portion of said kingpin and having helical means to engage said annular helical means to move said lever axially of said kingpin as the free end of said lever is moved about said kingpin to thereby draw said kingpin upwardly in one direction of movement of said lever to draw said plate-like members together and in frictional engagement to prevent movement of said yoke member about said carriage member, said yoke having at least one formed engageable surface thereon at a predetermined angular position about said kingpin, a movable pin mounted on said carriage and movable to engage said formed surface when in rotary register therewith, said pin being biased to move into engagement with said engageable surface, a crank mechanism operative when rotated to move said pin against its bias and out of contact with said surface, and a structure on and projecting from said lever to engage said instrumentality when said lever is swung in one direction and to disengage said instrumentality when said lever is swung in the opposite direction.

2. In a tool of the type described, the combination of a base, a work supporting table on said base, a vertical column positioned rearwardly on said table, an arm supported above said table and operatively supported on said vertical column for swinging movement across said table in a substantially horizontal plane, an anti-friction carriage operatively supported on said arm for longitudinal movement therealong, frictional locking means operatively carried by said arm and movable between a plurality of positions, said frictional locking means being operative in one position to engage side portions of said vertical column and prevent said arm from being swung across said table, said frictional locking means being operative in other positions to permit said arm to be swung, a plate mounted on said column and having a plurality of indexing surfaces, a lug carried by said arm, said lug being movable relative to said arm between a first position, in which said lug is in engagement with one of said indexing surfaces, and a second position, in which said lug is disengaged from said indexing surfaces, a first single lever mounted upon said arm and operatively connected to consecutively move said lug and said first frictional locking means between said first and second positions, a yoke beneath said carriage, said yoke and said carriage having axially aligned bores, a kingpin operatively positioned in said bores to support said yoke, said kingpin having a portion extending upwardly beyond the bore in said carriage, said portion of said kingpin being threaded, a second lever having a free end, the other end of said lever being provided with a threaded bore operative to engage said threaded portion of said kingpin so that movement of said second lever about said kingpin will secure said yoke member against rotary motion with respect to said carriage and said kingpin will support said yoke member on said carriage, said yoke having at least one indexing surface, a lug mounted on said carriage for movement to engage and disengage said indexing surface on said yoke, a crank mechanism operative when rotated to move said lug into disengaged position with respect to said indexing surface, and an instrumentality fixedly mounted on said lever to rotate said crank mechanism whereby said lug is moved into an operative position when said lever is moved in one direction.

3. In a woodworking tool, the combination of a base, a work supporting table on said base, a vertical column disposed rearwardly of said base, an arm supported above said table and operatively supported on said vertical column for swinging movement across said table in a substantially horizontal plane, frictional locking means operatively carried by said arm and movable between positions, said frictional locking means operative when in one position to engage side portions of said vertical column and prevent said arm from being swung, said frictional locking means operative in other positions to permit said arm to be swung, a plate mounted upon said column and having indexing surfaces, a lug carried by said arm, said lug being movable relative to said arm between a first position in engagement with one of said indexing surfaces and a second position disengaged from said indexing surfaces, and a single lever mounted upon said arm and being operatively connected to consecutively move said lug and said frictional locking means between said first, second, other and one positions.

4. In a woodworking tool, the combination of a base, a work supporting table on said base, a vertical column disposed rearwardly of said base, an arm supported above said table and being operatively supported on said vertical column for swinging movement across said table in a substantially horizontal plane, frictional locking means operatively carried by said arm and movable between a series of positions, said frictional locking means operative when in one position to engage said vertical column and prevent said arm from being swung, said frictional locking means operative in other positions to permit said arm to be swung, a plate mounted upon said column and having indexing surfaces, a lug carried by said arm, said lug being movable relative to said arm between a first position in engagement with one of said indexing surfaces and a second position disengaged from said indexing surfaces, a rotatable bolt operatively connected to move said frictional engaging means between said one and other positions, a wrench connected to rotate said bolt and movable between said first and second positions, and a single lever mounted upon said arm and being operatively connected to rotate said wrench to move said lug and said frictional locking means between all of said positions in response to movement of said lever.

5. In a woodworking tool, the combination of a base, a work supporting table on said base, a vertical column disposed rearwardly of said base, an arm supported above said table and being operatively supported on said vertical column for swinging movement across said table in a substantially horizontal plane, frictional locking means operatively carried by said arm and movable between certain positions, said frictional locking means operative when in one position to engage said vertical column and prevent said arm from being swung, said frictional locking means operative in other positions to permit said arm to be swung, a plate mounted upon said column and having indexing surfaces, a lug carried by said arm, said lug being movable relative to said arm between a first position in engagement with one of said indexing surfaces and a second position disengaged from said indexing surfaces, lost motion means connected to said lug, and a single lever mounted upon said arm and being operatively connected to said lost motion means and to said frictional locking means whereby said lug and said frictional locking means are consecutively operated.

6. In a woodworking tool, the combination of a base, a work supporting table on said base, a vertical column disposed rearwardly of said base, an arm operatively connected adjacent to one end thereof to said vertical column rotatable in a horizontal plane across said table, the other end of said arm extending outwardly across said table, a plate mounted upon said vertical column adjacent to said arm and having engageable surfaces at predetermined positions, a lug operably carried by said arm for movement therewith, said lug being further movable relative to said arm and engageable with said engageable surfaces to index said arm, frictional engaging means operable to engage side portions of said vertical column and prevent rotation of said arm when said frictional engaging means is in one position, and a single lever means mounted adjacent to the other end of said arm and operably connected to said lug and said frictional engaging means to consecutively move the same into engaging position in response to movement of said lever means.

7. In a power tool, the combination of a base, a work supporting table on said base, an arm positioned above said work supporting table, a tool supporting carriage adapted to reciprocate along said arm, said carriage having a vertical central bore, a yoke beneath said carriage, said yoke having a bore in axial alignment with said carriage bore, a kingpin operatively positioned in said bores to support said yoke, a portion of said kingpin extending upwardly beyond the bore in said carriage, said portion of said kingpin being threaded, a lever having a free end, the other end of said lever being provided with a threaded bore operative to engage said threaded portion of said kingpin so that movement of said lever about said kingpin will secure said yoke member against rotary motion with respect to said carriage and said kingpin will support said yoke member on said carriage, said yoke having at least one indexing surface, a lug mounted on said carriage for movement to engage and disengage said indexing surface, a mechanism operative when contacted to move said lug into a disengaged position with respect to said indexing surface, an instrumentality projecting outwardly from said lever to contact said mechanism, said arm carrying a longitudinal stationary brake element, said kingpin having a substantially axial vertical bore therethrough, clamping means movable between engaged and disengaged positions with respect to said brake element, and a movable pin in said bore operatively connected to move said clamping means, said pin being movable to operatively engage said brake element on said arm when said clamping means is in said engaged position to frictionally arrest the movement of said carriage at any position along said arm.

8. In a power tool, the combination of a base, a work supporting table on said base, an arm positioned above said work supporting table, a tool supporting carriage adapted to reciprocate along said arm, said carriage having a vertical central bore, a yoke supported beneath said carriage, said yoke having a bore in axial alignment with said bore of said carriage, a kingpin operatively positioned in said bores to support said yoke, a portion of said kingpin extending upwardly beyond the bore in said carriage, said portion being threaded, a lever having a free end, the other end of said lever being provided with a threaded bore operative to engage said threaded portion of said kingpin so that movement of said lever about said kingpin will secure said yoke member against rotary motion with respect to said carriage and said kingpin will support said yoke member on said carriage, said yoke having at least one indexing surface, a lug mounted on said carriage for movement to engage and disengage said indexing surface, a mechanism operative when contacted to move said lug into a disengaged position with respect to said indexing surface, an instrumentality rigidly mounted on said lever to contact said mechanism, said arm carrying a longitudinal stationary brake element, said kingpin having a substantially axial vertical bore therethrough, a C-shaped clamp disposed above said vertical bore of said kingpin and movable between a first position in engagement with said brake element and a second position disengaged from said brake element, said clamp being provided with a threaded portion, and a movable pin disposed in said bore and being provided at its upper end with a threaded portion in engagement with the threaded portion of said clamp, said pin being movable to operatively engage said brake element when said clamp is in said engaged position to frictionally arrest the movement of said carriage at any position along said arm.

9. In a power tool, the combination of a base, a work supporting table on said base, an arm positioned above said work supporting table, a tool supporting carriage adapted to reciprocate along said arm, said carriage having a vertical central bore formed therein, a yoke beneath said carriage, said yoke having a bore formed therein in axial alignment with said carriage bore, a kingpin operatively positioned in said bores to support said yoke, said kingpin extending upwardly beyond the bore in said carriage, said extended portion of said kingpin having threads formed thereon, a lever having a free end and having formed at its other end a threaded bore operative to engage said threaded portions of said kingpin, so that movement of said lever about said kingpin will secure said yoke member from rotary motion with respect to said carriage and said kingpin will support said yoke member to said carriage, said yoke having at least one engageable surface formed thereon, a movable lug movably mounted on said carriage and movable to engage and disengage said engageable surface, a crank mechanism operative when rotated to move said lug into nonsurface engaging position, and an instrumentality fixedly mounted on said lever to rotate said mechanism whereby said lug is moved into inoperative position when said lever is moved in one direction.

References Cited in the file of this patent

UNITED STATES PATENTS

| | | |
|---|---|---|
| 934,484 | Wadkin et al. | Sept. 21, 1909 |
| 1,268,277 | Ransdall | June 4, 1918 |
| 1,400,614 | Lovejoy | Dec. 20, 1921 |
| 1,815,037 | De Walt | July 21, 1931 |
| 2,022,288 | Knapp | Nov. 26, 1935 |
| 2,185,304 | Knapp | Jan. 2, 1940 |
| 2,289,259 | Gardner et al. | July 7, 1942 |
| 2,340,953 | Gardner | Feb. 8, 1944 |
| 2,347,374 | Stahler | Apr. 25, 1944 |
| 2,353,088 | Schutz | July 4, 1944 |
| 2,580,110 | Mabry | Dec. 25, 1951 |
| 2,584,863 | Gesner | Feb. 5, 1952 |
| 2,590,093 | Duerr | Mar. 25, 1952 |
| 2,590,119 | Osterhus | Mar. 25, 1952 |
| 2,611,398 | Schutz | Sept. 23, 1952 |
| 2,722,952 | Snyder | Nov. 8, 1955 |
| 2,759,502 | Auchincloss | Aug. 21, 1956 |

FOREIGN PATENTS

| | | |
|---|---|---|
| 542,807 | Great Britain | Jan. 28, 1942 |
| 694,349 | Great Britain | July 15, 1953 |